Aug. 15, 1961  D. A. GALONSKA ET AL  2,995,948
BALL BEARING SCREW AND NUT ASSEMBLY
Filed Dec. 1, 1958
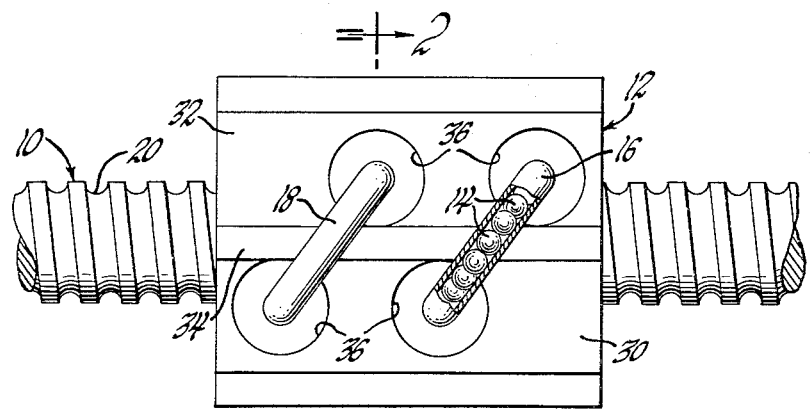
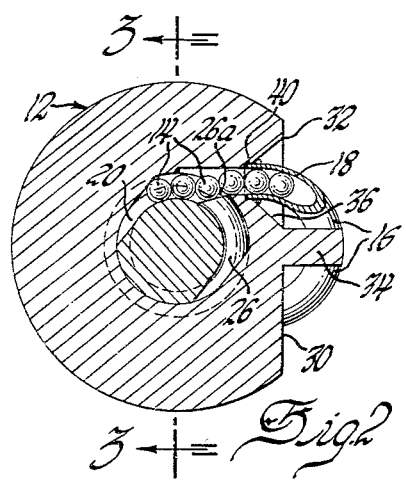
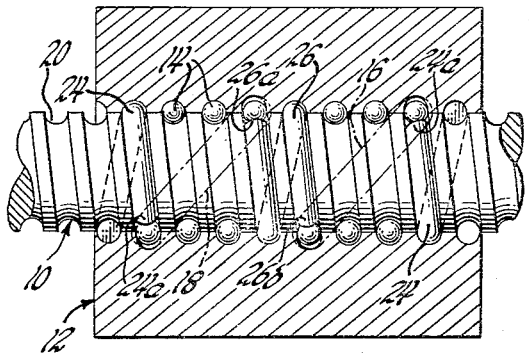
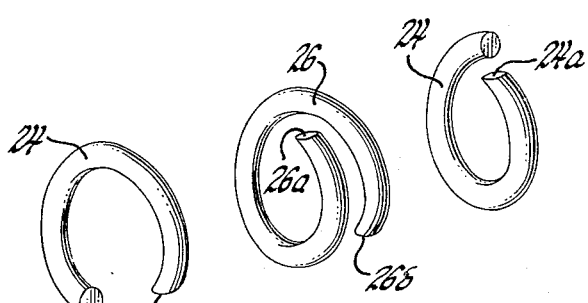
INVENTORS
David A. Galonska, &
BY William T. Gobble
Bryce Beecher
ATTORNEY United States Patent Office 2,995,948
Patented Aug. 15, 1961

2,995,948
BALL BEARING SCREW AND NUT ASSEMBLY
David A. Galonska and William T. Gobble, Saginaw, Mich., assignors to General Motors Corporation, Detroit, Mich., a corporation of Delaware
Filed Dec. 1, 1958, Ser. No. 777,443
3 Claims. (Cl. 74—459)

This invention relates to an improvement in screw and nut devices of the type in which the complementary helical threads of the screw and nut provide a race for a ball train constituting the connection between the two parts. In its most particular aspect, the invention concerns a device of the category indicated including a plurality of transfer tubes whereby a plurality of endless helical passages are formed for a like number of ball trains. Such a device is described, for example, in Hawkins Patent 2,267,524.

The invention has in contemplation extremely small ball nut and screw assemblies possessed of unusually high efficiency and accuracy. Thus, in accordance therewith, a miniature, light-weight assembly with only $9/16''$ ball circle diameter having upwards of 90% efficiency has been produced and found capable of positioning mechanical components within .0005" for each inch of lineal travel of the ball nut or screw.

The invention opens up very interesting possibilities in the areas of electronic controls, radar tuners, missile and rocket guidance and telemetering systems, automatic switching devices and many other engineering applications where critical positioning problems are encountered along with stringent space and weight limitations.

The principal objects of the invention being implicit in the foregoing, the same will now be described in point of a preferred embodiment thereof illustrated by the accompanying drawings wherein:

FIGURE 1 is an assembly view with the screw shown broken away and one of the transfer tubes in section;
FIGURE 2 is a section on the line 2—2 in FIGURE 1;
FIGURE 3 is a section on the line 3—3 in FIGURE 2; and
FIGURE 4 is an isometric view of the deflector elements incorporated in the assembly.

In FIGURE 1, the numerals 10 and 12 respectively denote the screw and nut components of the assembly, which also comprises balls 14, those shown being confined by a transfer tube 16. A second transfer tube 18 is identical in construction with the transfer tube 16.

The helical groove 20 of the screw is matched by a complementary helical groove formed internally of the nut 12, all as well understood in the art to which the invention relates. Suffice it to say here that with one of the screw and nut held against axial movement and free to be rotated relative to the other, such other part will be caused to move lineally if restrained against rotary movement.

The illustrated device includes two separate ball circuits as reflected by the two transfer tubes. To deflect the balls into and out of the transfer tubes, there are provided a pair of wire elements 24 and a wire element 26, the latter being disposed between the elements 24. Each element 24 has one of its ends 24a shaped as a ball deflector, while in the case of wire element 26 both ends thereof, 26a and 26b, are so shaped. In the instance of the particular embodiment, wire elements 24 have a coil of 315° while the coil of element 26 is 524°. It will, of course, be appreciated that the extent of the coil is largely arbitrary except in the instance of the central element 26 where the coil determines the spacing between the ball circuit. The latter coil, as should be apparent, serves both of the ball circuits shown, end 26a acting as a deflector with respect to transfer tube 18 and end 26b so acting with respect to transfer tube 16.

It has been found that the elements 24, 26 are most suitably fixed in the nut 12 by copper hydrogen brazing. Music wire has been found well suited for the miniature designs. In practice, the deflector ends of the elements are formed by machining in situ, i.e., after the elements have been fixed in position in the helical nut groove.

It is to be observed that the nut is doubly flatted (30, 32) and that the flatting gives rise to a ridge 34. By reason of the flatting, a shorter machine tool, readily passed through the flared opening 36 in the nut, may be employed. The transfer tubes are located at assembly by seating them against the inner wall of a counterbore 40 in which the flared openings 36 terminate. To make the transfer tubes secure, the same are soldered to the rib 34, a soft silver solder being preferably used in the case of the miniature models referred to hereinabove.

What is claimed is:
1. In a multiple circuit ball nut and screw device of the type including a pair of spaced transfer tubes carried by the nut each operating to make endless a ball race formed by the complementary helical grooves of the screw and nut, a wire coil element firmly bonded substantially throughout its length in the helical groove of the nut mediate the inner ends of said transfer tubes, the ends of such element being shaped so as to serve as deflectors with respect to the balls entering and leaving the said ends of said transfer tubes.

2. In a ball nut and screw device of the type including a transfer tube having an end which through a passage in the nut opens to the helical ball race formed by the groove of the screw and the complementary groove formed internally of the nut, a wire coil element bonded substantially throughout its length to the nut in the helical groove thereof, one end of said wire coil element being located at the point of opening of said passage to said race, such end being shaped so as to serve as a deflector with respect to the balls entering and leaving said transfer tube.

3. In a ball nut and screw device of the type including a transfer tube having an end which through a passage in the nut opens to the helical ball race formed by the groove of the screw and the complementary groove formed internally of the nut, a wire coil element brazed substantially throughout its length to the nut in the helical groove thereof, one end of said element being located at the point of opening of said passage to said race, such end being shaped so as to serve as a deflector with respect to the balls entering and leaving said transfer tube.

References Cited in the file of this patent
UNITED STATES PATENTS

| | | |
|---|---|---|
| 2,380,662 | Means | July 31, 1945 |
| 2,505,131 | Means | Apr. 25, 1950 |
| 2,636,367 | Jacubenta | Apr. 28, 1953 |
| 2,783,656 | Fisher | Mar. 5, 1957 |